Aug. 12, 1947.  C. J. HUEBER  2,425,322
PRINTING PLATE BLANK AND CARRIER THEREFOR
Filed July 9, 1942
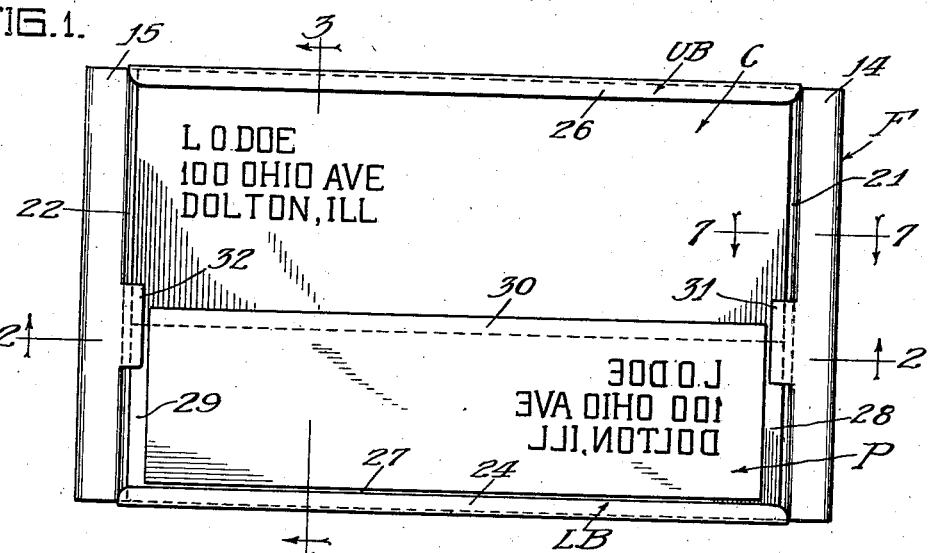
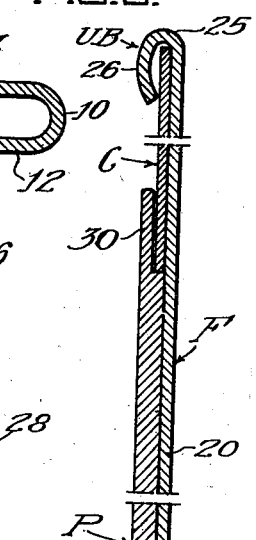
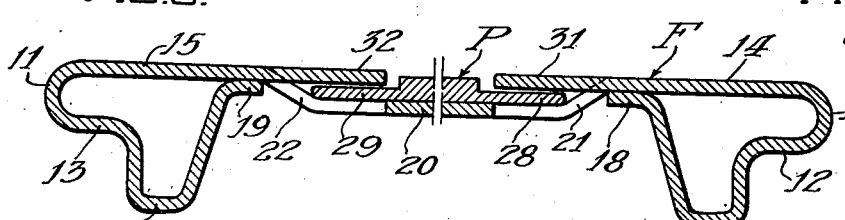
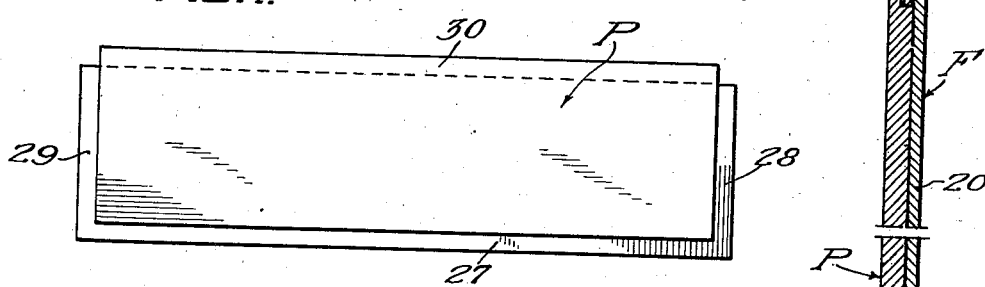
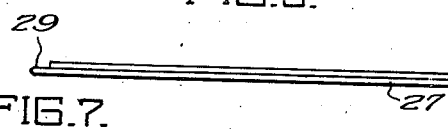
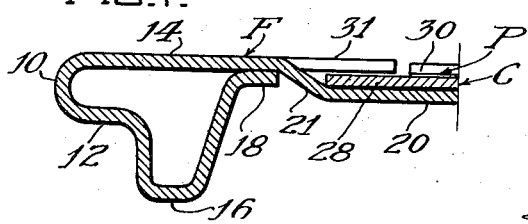
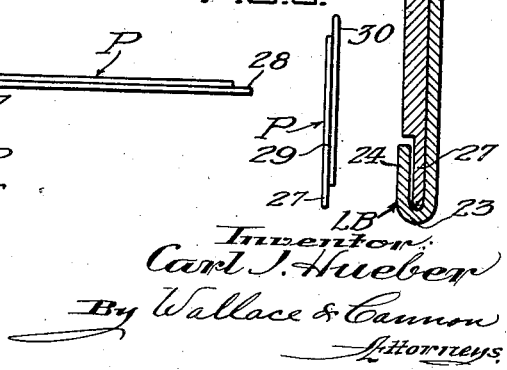
Inventor
Carl J. Hueber
By Wallace & Cannon
Attorneys Patented Aug. 12, 1947

2,425,322

UNITED STATES PATENT OFFICE 2,425,322

PRINTING PLATE BLANK AND CARRIER THEREFOR

Carl J. Hueber, Euclid, Ohio, assignor to Addressograph-Multigraph Corporation, Cleveland, Ohio, a corporation of Delaware Application July 9, 1942, Serial No. 450,319

13 Claims. (Cl. 101—369)

1

This invention relates to printing devices of the kind embodying a frame for at least one embossable printing plate and also an index card adapted to bear an impression from at least selected of the type characters embossed on the plate.

Heretofore printing plates and index cards have been retained on the frames therefor by retaining devices struck up from the frames and formed to overlie the marginal portions of the plates and cards. Retaining devices of this character have usually been arranged to retain cards against movement both longitudinally and transversely on the frames, but such devices have usually been arranged to retain the plates only against movement transversely on the frames. In order to prevent movement of the plates longitudinally on the frames and in order to enable the plates to be inserted into and removed from retaining devices of the aforesaid character, depressible portions have been formed on the frames in position to cooperate with adjacent ends of the plates. In some instances and in certain kinds of frames of the aforesaid character, as these have been constructed heretofore, there have been instances where the depressible portions become deformed in the course of careless use of the devices that they failed to perform the plate retaining function thereof and in such instances the plates have objectionably moved longitudinally on the frames which has interfered with proper use of the printing devices. It has been necessary, however, to resort to such depressible portions to enable insertion into and removal of the plates from the frames. Hence, among the objects of the present invention is to retain printing plates on the frames therefor without resorting to depressible portions on the frames and thereby insure that undesired displacement of the plates from the frames will be avoided.

Moreover, the retaining devices for the plates that have been struck up from the frames and formed to overlie the marginal portions of the plates have heretofore so projected over and above the faces of the plates on which type characters embossed on the plates appear in relief, and from which faces of the plates impressions are made upon passage of the printing devices through suitable printing machines, that impressions have sometimes been made not only from the type characters embossed on the plates but also from the retaining devices that project over and above the faces of the plates from which the impressions are made and unsightly and

2 otherwise objectionable impressions have thus been produced. This has been particularly true when the impression making means in the printing machine has been so improperly adjusted as to exert such pressure that the yieldable portion of such means adapted to cooperate with the type characters has been so deformed in the course of impression operations that undesired impressions were made from the retaining devices as aforesaid.

Thus still another important object of this invention is to so retain printing plates on the frames therefor that impressions will not be made from the retaining devices that are effective to retain plates on the frames, and an object ancillary to the foregoing is to so arrange the plates and frames that the retaining devices effective to retain the plates on the frames will not project above the faces of the plates on which type characters embossed on the plates appear in relief.

It has been found in the course of use of printing devices of the aforesaid character that it is sometimes necessary to change the type characters that are embossed on a particular printing plate as in an instance where a name and address may be printed from the type characters so embossed on the plate and there is a change in the address. Such changes are sometimes made by depressing the previously embossed type characters and then reembossing new type characters on the plate, and in other instances one such plate is discarded and a new plate is embossed and substituted therefor on the frame. Irrespective of how the type characters are changed on a printing plate, it is usually necessary to also change the index card that is included on the frame of the printing device for such card usually bears an impression from at least selected of the type characters embossed on the plate, and whenever those type characters which are employed in producing an impression on the index card are changed it is necessary to also change the index card. In this regard, it has been observed that usually where there is a change in the type characters it is also necessary to change the index card. Heretofore, however, the index cards and plates have been retained on the frames therefor independently of each other and there have been instances where a change has been made in the type characters and a corresponding change has not been made in the index card. This is obviously objectionable inasmuch as the index card is utilized in filing and for other reference purposes and sometimes the data that appear thereon are copied therefrom without reference to the plate, particularly since it is much easier to read the index card than to read the embossed type characters which appear in reverse, and it is therefore important that the type characters and the impression on the index card correspond.

Hence other important objects of the present invention are to so retain the index card and plate on the frame therefor that it will be insured that the index card will be removed each time the printing plate is removed so as to thereby promote changing of the index card whenever a change is made in the type characters embossed on a particular printing plate or when one printing plate is substituted for another; to so interrelate the index card and the printing plate or plates retained on a particular frame that these parts will so cooperate with one another as to assist in retaining each other on the frame; and to so arrange an index card and a printing plate that these parts will embody overlapping portions which will so cooperate one with the other that undesired movement of both the plate and card relative to the frame will be avoided.

Heretofore it has been necessary to so form the retaining devices adapted for cooperation with printing plates on frames of the aforesaid character that such retaining devices would overlie and project above the face of the plate adapted to be retained thereby since the printing plates that have been used heretofore have been of uniform thickness throughout the area thereof, and it is this that has attributed to the possibility that impressions might be made from such retaining devices under circumstances, for example, as those set forth hereinabove. Hence, yet another object of this invention is to so form a printing plate adapted for use on a printing device frame that it will embody marginal portions of a thickness less than the portion of the plate whereat type characters are to be embossed so that retaining devices adapted for cooperation with the plate may be projected onto these portions of reduced thickness in such a way as to not objectionably project above the face of the plate on which type characters embossed on the plate appear in relief.

Yet further objects of the present invention are to form a depressed panel in a printing device frame in which at least one printing plate and an index card may be arranged; to so form a printing device frame embodying such a depressed panel that at least one printing plate and an index card may be arranged in side-by-side relation on the frame; to form a flange on the portion of a printing plate that is to lie in juxtaposition to an index card when the card and plate are arranged in side-by-side relation in a frame embodying a depressed panel of the aforesaid character whereby the flange may project over the adjacent portion of the card and thereby afford a retaining means therefor; to provide portions of reduced thickness on the marginal edges of a printing plate and to provide retaining devices on the frame adapted for cooperation with such portions of reduced thickness so as to thereby prevent movement of the plate away from the face of the frame on which it is mounted and yet avoid objectionably projecting the retaining devices on the frame above the face of the plate on which type characters embossed on the plate appear in relief; to so relate the size of a printing plate embodying a flange of the aforesaid character and an index card adapted for use therewith and to so position retaining devices of the just referred to character on the frame that when the plate and card are mounted on the frame, portions of both the card and plate will underlie the retaining devices so as to thereby be held against undesired movement relative to the frame; to extend a depressed panel afforded in a printing device frame between opposite edges thereof and to form plate or card retaining devices along such opposite edges of the frame in alignment with the depressed panel; and to so relate a printing device frame of the aforesaid character and an index card and printing plate to be retained thereon and the retaining devices formed on the frame for such card and plate that when the printing plate is inserted into the retaining devices therefor on the frame and thereafter the index card is arranged beneath the flange on the plate adapted to overlie the card and is then inserted into the retaining devices for the card on the frame, the card and plate will be held against undesired displacement from the frame.

Yet further objects are to provide a printing plate having flanges along selected marginal edges thereof that are formed to lie flush with one face of the plate and to lie below the plane of the opposite face of the plate to thereby enable the plate to be fitted into retaining devices therefor on the frame that are so arranged as to not objectionably project above the face of the plate when the plate is mounted on the frame with the face thereof with which the flanges are formed to be flush disposed toward the frame; and to provide yet another flange along at least one other marginal edge of a printing plate of the aforesaid character that is arranged flush with the face of the printing plate opposite that face thereof with which flanges formed along other marginal edges thereof are disposed to be flush.

Other and further objects of the present invention will be apparent from the following description and claims and are illustrated in the accompanying drawing which, by way of illustration, shows a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawing,

Fig. 1 is an elevational view of a printing device embodying my invention;

Figs. 2 and 3 are sectional views, drawn to an enlarged scale, taken substantially and respectively on the lines 2—2 and 3—3 on Fig. 1;

Fig. 4 is an elevational view of an embossed printing plate of the kind shown in Fig. 1;

Fig. 5 is an end view of the printing plate shown in Fig. 4 looking in at the lower edge thereof as it is shown in Fig. 4;

Fig. 6 is an end view of the printing plate shown in Fig. 4 looking in at the left-hand end of the plate as it is shown in Fig. 4; and Fig. 7 is a sectional detail view also drawn to an enlarged scale and taken substantially on the line 7—7 on Fig. 1.

The printing device illustrated in the accompanying drawing embodies a frame F on which an index card C and a printing plate P are retained against undesired displacement. The frame F is desirably formed from a blank struck from a flat sheet of suitable material as steel, aluminum or, if desired, a suitable fibrous or plastic material and the blank is desirably substantially rectangular in outline.

In the course of fabrication of a carrier or frame as F, the blank, as aforesaid, is folded along the shorter edges thereof to afford rounded edges 10 and 11 and the material is then folded inwardly to afford ledges 12 and 13 which extend in substantially parallel but spaced apart relation with the marginal portions 14 and 15 on the blank and which are located immediately inwardly of the rounded edges 10 and 11. The portion of the material outwardly of the ledges 12 and 13 is folded downwardly into substantially right angular relation with these ledges and is thereafter folded inwardly to afford rails 16 and 17 that also lie in substantially parallel but spaced apart relation with the marginal portions 14 and 15, the rails 16 and 17 being spaced, therefore, further from the marginal portions 14 and 15 than are the ledges 12 and 13. The material is then folded upwardly, desirably so as to be inclined inwardly, and the marginal portions along the free edges of the material as thus folded are extended to afford flanges 18 and 19 which respectively lie against the under faces of the marginal portions 14 and 15 so as to have the free edges thereof arranged substantially in alignment with the inner edges of the marginal portions 14 and 15. Such an arrangement of the material along the shorter edges of the blank, from which the frame F is formed, so as to provide the rails 16 and 17, defines what are commonly referred to as spacing flanges. Thus, when the rails as 16 and 17 on one printing device frame are engaged with the exposed faces of the marginal portions as 14 and 15 on another printing device frame, type characters embossed on a plate as P retained on the frame embodying the exposed faces so engaged are prevented from coming in contact with the frame embodying the rails as 16 and 17 that engaged said exposed faces and thereby damage to such type characters is avoided. Moreover, the printing devices ride on the rails 16 and 17 during passage thereof through the printing machines in which they are utilized.

The portion of the blank, from which the frame F is formed, intermediate the inwardly disposed edges of the marginal portions 14 and 15 is preferably formed so as to afford a depressed panel 20 that is joined to the inner edges of the marginal portions 14 and 15 by inclined portions 21 and 22. Desirably, the inclined portions 21 and 22 and the panel 20 extend between the longer edges of the frame as F.

Further, the portion of the blank, from which the frame F is formed, in alignment with the depressed panel 20, and the inclined portions 20 and 21, along one of the longer edges of the blank is folded upon itself to provide a rounded edge 23, Fig. 3, and terminates in a flange 24 which extends over but in spaced relation with the face of the frame F on which the printing plate is received and this arrangement affords what will be referred to hereinafter as the lower retaining bead LB on the frame F. A corresponding portion of the blank, from which the frame F is formed, is somewhat similarly folded to afford a rounded edge 25 and a flange 26, and this arrangement affords what will be referred to hereinafter as the upper retaining bead UB on the frame. Thus upper and lower beads UB and LB are provided on the frame along the edges of the depressed panel 20 and these beads respectively serve as index card and printing plate retaining means and in cooperation with other arrangements embodied in my novel printing device serve to prevent undesired movement of the card as C and plate as P relative to the frame F.

A printing plate P of the character adapted to be retained on the frame F is illustrated in Figs. 4, 5 and 6 and is desirably formed from a substantially rectangular blank of suitable sheet material as steel or aluminum or a plastic or fibrous material. The blank affording the plate P is desirably rolled, milled or otherwise formed to afford a flange 27 along one of the longer edges of the blank which, as best shown in Figs. 5 and 6, is arranged to have one face thereof at least substantially flush with one face of the main body of the plate P but which has the other face thereof disposed below the face of the main body of the plate P opposite that with which the opposite face of the flange is arranged to be flush. Moreover, flanges as 28 and 29 are similarly provided along the shorter edges of the blank affording the plate P so that, in effect, a continuous flange is provided about three edges of the blank, one face of this continuous flange desirably lying at least substantially flush with one face of the main body of the plate and the opposite face of the continuous flange lying below the other face of the main body of the plate. Yet another flange 30 is formed on the plate P to extend between the inner edges of the flanges 28 and 29, and this flange 30 is so formed on the plate that one face thereof lies at least substantially flush with the face of the main body of the plate below which one face of the aforesaid continuous flange is disposed and the other face of this flange 30 lies below that face of the main body of the plate P with which one face of the aforesaid continuous flange is arranged to be at least substantially flush. Thus, in contradistinction to printing plates which have heretofore been retained on printing device frames, the plate P is not of substantially uniform thickness throughout the area thereof but rather has flanges of reduced thickness about the marginal edges thereof.

A printing plate P of the aforesaid character is adapted to be arranged in a frame as F in such a way as to have that face of the plate, with which one face of the aforesaid continuous flange is substantially flush, disposed against the adjacent face of the frame whereby the other flange as 30 on the plate is arranged in spaced relation with the adjacent face of the frame. Such disposition of the flange as 30 affords what will be referred to hereinafter as an overhanging flange, such flange being adapted to overlie the adjacent marginal portion of an index card as C when the plate and card are arranged in side-by-side relation on the panel 20 intermediate the inclined portions 21 and 22.

A substantially rectangular plate and card which are to be arranged on a frame as F in side-by-side relation are so related in size that the combined width thereof across the shorter dimensions thereof will equal the distance between the inner portions of the rounded edges as 23 and 25 and in so computing the combined width of the plate and card, the width of a flange as 30 is disregarded for a reason that will be apparent presently. Therefore, when the flange 27 on a printing plate as P is inserted in the lower bead LB in the manner illustrated in Fig. 3 and the marginal edge of a card as C is inserted into the upper bead as UB, these two beads serve respectively to hold the plate and card against the adjacent face of the frame. Moreover, when a card and plate are so respectively engaged with the beads LB and UB, the marginal edge of the card opposite that extended into the upper bead UB lies below the flange as 30 on the plate P which therefore, with the upper bead UB, is effective to prevent movement of the card away from the adjacent face of the frame F.

In order to insure that a plate as P and, therefore, a card as C, will be held against the adjacent face of the frame when the plate is arranged on the frame in the manner hereinabove described, retaining devices 31 and 32 are provided along the inner edges of the marginal portions 14 and 15, these retaining devices respectively being formed from the inclined portions as 21 and 22 and the adjacent portions of the depressed panel 20 and being arranged to extend in the planes of the marginal portions 14 and 15, these retaining devices 31 and 32 desirably being struck from such portions of the frame as an incident to the fabrication of the frame. The amount in which the panel 20 is depressed beneath the plane in which the faces of the marginal edges 14 and 15 are disposed to lie is such that the face of the panel 20 disposed toward the retaining devices 31 and 32 will be spaced from the adjacent faces of such retaining devices in an amount sufficient to enable the flanges as 28 and 29 to be neatly fitted beneath the retaining devices 31 and 32 when the printing plate P is engaged with the adjacent face of the frame F with the flange 27 on the plate disposed in the lower bead LB.

The position at which the retaining devices as 31 and 32 are formed along the extent of the marginal portions 14 and 15 is determined by the relative widths of the plate and card to be retained on the frame F and desirably these devices are located in such position as to overlie adjacent portions of both the plate and card. Furthermore, corresponding ends of the retaining devices 31 and 32 must be so spaced from the adjacent inner edge of the flange as 26 that the plate P may be flatly laid onto the adjacent face of the frame and thereafter slid over the face of the frame to cause the flanges 28 and 29 to pass beneath the retaining devices 31 and 32 so as to thereafter have the flange 27 pass into the bead LB. It will therefore be seen that the relative widths of the plate and card may be varied substantially from those illustrated in the accompanying drawing and in this respect it will be understood that it is the width of the plate more than the width of the card that is the determining factor in so far as the location of the retaining devices 31 and 32 along the inner edges of the marginal portions 14 and 15 is concerned for the reason that the plate as P is relatively inflexible whereas the card as C is flexible. However, the upper limitation of the width of the plate P will be that the card C must be of sufficeint width as to enable it to be flexed as to be insertible into the upper bead as UB and beneath the flange on the plate as P on the frame as F. Moreover, it will be understood that two printing plates as P might be retained in side-by-side relation on a frame as F merely by locating additional retaining devices as 31 and 32 in proper positions along the inner edges of the marginal portions 14 and 15. Such additional retaining devices would be disposed to overlie the flanges as 28 and 29 on the two printing plates of which the lower printing plate would have a flange as 30 that would overlie a flange as 27 on the upper of such plates.

In the practice of this invention it is desirable that flanges be formed along at least two edges of the printing plate and in those instances where the plate is substantially rectangular in outline such flanges will be disposed along the shorter edges of the plate. It is, however, advantageous to form an additional flange along a third edge of the printing plate and desirably such flange is so related to the other two flanges that, in effect, a continuous flange is formed about three edges of the prnting plate. It will be understood, however, that while I have shown the flanges that are thus formed on the printing plate as being of such a nature as to embody substantially parallel faces, other configurations could be imparted to the marginal portions of the plate without departing from the purview of the present invention. It is also to be understood that the flanges that are so formed on printing plates in accordance with this invention are in the nature of flanges included on printing plates in accordance with the disclosure in the copending application of Carl J. Hueber and William J. Hampton, Serial No. 450,318, filed July 9, 1942, and that the various forms of flange arrangements disclosed in that application could be utilized in the present invention if desired.

Furthermore, in accordance with this invention a flange is to be provided on the printing plate that is to be arranged to project over an adjacent marginal portion of the index card that is provided on the printing device frame or carrier on which the novel printing plate of this invention is to be arranged, such flange thereby affording a card retaining means. In this regard it is to be understood that a flange of this nature might advantageously be embodied on a printing plate that is retained on a printing device frame in a manner other than that hereinabove described, and so to do, of course, is within the purview of the present invention.

It will be appreciated from the foregoing description that a printing plate may be so retained on a printing device frame or carrier, in accordance with this invention, that those means effective to retain the plate on the carrier may be kept below or at least not projected objectionably above the face of the printing plate on which type characters are embossed to appear in relief, and in this way I am able to avoid making objectionable impressions from the plate retaining means afforded on the printing device frame or carrier.

Furthermore, in accordance with this invention, the plate and card mutually contribute to the retention of each other on the frame and to maintain each other in proper position on the frame or carrier on which they are mounted. This is particularly advantageous for the reason that such an arrangement promotes the likelihood that the index card will be changed each time the printing plate is changed or a change is made in the type characters which appear on the printing plate, this being important inasmuch as it is highly desirable that whatever impressions appear on the index card be accurately related to at least selected of the type characters that appear on the printing plate.

Many other advantages of the present invention will be apparent to those skilled in the art from the foregoing description and moreover while I have illustrated and described a preferred embodiment of my invention, it is to be understood that this is capable of variation and modification and I therefore do not wish to be limited to the precise details set forth, but desire to avail myself of such changes and alterations as fall within the purview of the following claims.

I claim:

1. A printing device including a carrier having a panel depressed in one face thereof, a printing plate and an index card mounted in said panel in side-by-side relation and between opposite ends of said panel with marginal edges thereof disposed to be interengageable, means along opposite free edges of said panel for retaining said plate and card against separating movement in said panel, and means for preventing movement of said plate and card upwardly from said panel and effective, in cooperation with said opposite ends of the panel and the means along opposite free edges of the panel, to limit movement of the plate and card in and away from said panel.

2. A printing device including a carrier having a panel depressed in one face thereof, a printing plate and an index card mounted in said panel in side-by-side relation and between opposite ends of said panel with marginal edges thereof disposed to be interengageable, means along opposite free edges of said panel formed and disposed to overlie the marginal portions of the plate and card opposite the interengageable edges thereof, means on the plate formed and disposed to overlie the marginal portion of the card adjacent the edge thereof engageable with the plate, and means on the carrier formed and disposed to overlie the marginal portions of the plate disposed adjacent said opposite ends of the panel and effective in cooperation with the means along opposite free edges of the panel and the means on the plate formed and disposed to overlie the marginal portions of the card to limit movement of the plate and card in and away from said panel.

3. A printing device including a carrier having a panel depressed in one face thereof, a printing plate and an index card mounted in said panel in side-by-side relation and between opposite ends of said panel with marginal edges thereof disposed to be interengageable, means along opposite free edges of said panel formed and disposed to overlie the marginal portions of the plate and card opposite the interengageable edges thereof, a flange along the edge of the plate engageable with the card formed to overlie the adjacent marginal portion of the card and having opposite ends thereof disposed in spaced relation with the ends of the plate juxtaposed the opposite ends of the said panel, and means in the carrier formed and disposed to overlie the marginal portions of the plate intermediate the opposite ends of said flange and the adjacent ends of the plate and effective in cooperation with the means along opposite free edges of the panel and the flange on the plate to limit movement of the plate and card in and away from said panel.

4. A printing device including a carrier having a panel depressed in one face thereof and arranged to extend between opposite edges of the carrier, the marginal portions along the edges of said carrier extended between the aforesaid edges being elevated relative to said panel to thereby define shoulders along the edges of said panel that extend between the aforesaid opposite edges thereof, a printing plate and an index card mounted in said panel in side-by-side relation and between said shoulders with marginal edges thereof disposed to be interengageable, means along opposite free edges of said panel extended between said shoulders and formed to overlie adjacent marginal portions of the card and plate respectively, a flange along the edge of said plate engageable with the card and formed to overlie the adjacent marginal portion of the card and having the opposite ends thereof arranged in spaced relation with said shoulders on the carrier when the plate is disposed in the panel, and means on the carrier projected inwardly from said shoulders and spaced above the adjacent face of the panel and terminated in spaced relation with opposite ends of the flange and effective in cooperation with the means along opposite free edges of the panel and the flange to limit movement of the plate and card in and away from said panel.

5. A printing device including a carrier, a printing plate and an index card mounted on one face of said carrier in side-by-side relation and having the marginal edges thereof disposed to be interengageable, card retaining means engageable with the marginal portion of the card opposite the edge thereof engageable with the plate, a flange on the plate along the edge thereof engageable with the card and formed to overlie the marginal portion of the card adjacent the edge thereof engageable with the plate, and other flanges on said plate along the edges thereof leading from the edge along which the flange formed to overlie the card is provided, said other flanges being formed to have corresponding faces thereof disposed beneath the plane of the face of the plate opposite that engaged with the carrier when the plate is mounted on the carrier with the flange thereon projected over the card, plate retaining means engageable with the marginal portion of the plate opposite the edge thereof engaged with the card, and means on said carrier formed to closely overlie said other flanges on the plate and effective in cooperation with said card retaining means, plate retaining means, and the flange on said plate to limit movement of said card and plate on and away from said one face of the carrier.

6. A printing device including a carrier, a printing plate and an index card mounted on one face of said carrier in side-by-side relation and having the marginal edges thereof disposed to be interengageable, card retaining means engageable with the marginal portion of the card opposite the edge thereof engageable with the plate, a flange on the plate along the edge thereof engageable with the card and formed to overlie the marginal portion of the card adjacent the edge thereof engageable with the plate, another flange on said plate along the edge thereof opposite that along which the first-named flange is formed, the second-named of said flanges having one face thereof disposed flush with the face of the plate that is engaged with the carrier when the plate is mounted on the carrier with the first-named flange thereon projected over the card, the opposite face of said flange being disposed beneath the plane of the face of the plate opposite that engaged with the carrier as aforesaid, plate retaining means on the carrier formed to closely overlie the second-named flange on the plate, and other means on the carrier formed and disposed to overlie the plate along marginal portions thereof at opposite ends of the edge thereof that is engageable with the card and effective in cooperation with the card retaining means, the plate retaining means, and the first-named flange on the plate to limit movement of the card and plate on and away from said one face of the carrier.

7. A printing device including a carrier, a printing plate and an index card mounted on one face of said carrier in side-by-side relation and having the marginal edges thereof disposed to be interengageable, card retaining means engageable with the marginal portion of the card opposite the edge thereof engageable with the plate, a flange on the plate along the edge thereof engageable with the card and formed to overlie the marginal portion of the card adjacent the edge thereof engageable with the plate, other flanges formed along the marginal portions of said plate other than that along which the first-named flange is formed, said other flanges having corresponding faces thereof formed to lie substantially flush with the face of the plate that is engaged with the carrier when the plate is mounted on the carrier with the first-named flange projected over the card, the opposite faces of said other flanges being disposed beneath the plane of the face of the plate opposite that engaged with the carrier as aforesaid, plate retaining means on the carrier formed to closely overlie the one of said other flanges that is disposed along the edge of the plate opposite that along which the first-named flange is formed, and means on said carrier formed to closely overlie the other of said flanges that are formed along the edges of said plate that extend in angular relation with the edge thereof along which the first-named flange is formed and effective in cooperation with said card retaining means, plate retaining means, and the first-named flange on said plate to limit movement of said card and plate on and away from said one face of the carrier.

8. A printing device including a carrier having a panel depressed in one face thereof, a printing plate and an index card mounted in said panel in side-by-side relation and between opposite ends of said panel with the marginal edges thereof disposed to be interengageable, card retaining means along one free edge of said panel and engageable with the marginal portion of the card opposite the edge thereof engageable with the plate, a flange on the plate along the edge thereof engageable with the card and formed to overlie the marginal portion of the card adjacent the edge thereof engageable with the plate, another flange along the marginal edge of said plate opposite that along which the first-named flange is formed, said other flange having one face thereof formed to lie substantially flush with the face of the plate that is engaged with the carrier when the plate is mounted in the panel with the first-named flange thereon projected over the card, plate retaining means along the free edge of said panel opposite that whereat said card retaining means is formed and which is formed to closely overlie the flange that is disposed along the edge of the plate opposite that along which the first-named flange is formed, and means on the carrier formed and disposed to overlie the plate along marginal portions thereof at opposite ends of the edge thereof that is engageable with the card and effective in cooperation with the card retaining means, the plate retaining means, and the first-named flange on the plate to limit movement of the plate and card in and away from said panel.

9. A printing device including a carrier having a panel depressed in one face thereof, a printing plate and an index card mounted in said panel in side-by-side relation and between opposite ends of said panel with the marginal edges thereof disposed to be interengageable, card retaining means along one free edge of said panel and engageable with the marginal portion of the card opposite the edge thereof engageable with the plate, a flange on the plate along the edge thereof engageable with the card and formed to overlie the marginal portion of the card adjacent the edge thereof engageable with the plate, other flanges formed along the marginal portions of said plate other than that along which the first-named flange is formed, said other flanges having corresponding faces thereof formed to lie substantially flush with the face of the plate that is engaged with the carrier when the plate is mounted in the panel with the first-named flange thereon projected over the card, the opposite faces of said other flanges being disposed to lie beneath the plane of the face of the plate opposite that engaged with the carrier as aforesaid, plate retaining means along the free edge of said panel opposite that whereat said card retaining means is formed and which is formed to closely overlie the flange that is disposed along the edge of the plate opposite that along which the first-named flange is formed, and means on the carrier formed to closely overlie the other of said flanges that are formed along the edges of said plate that extend in angular relation with the edge thereof along which the first-named flange is formed and effective in cooperation with said card retaining means, plate retaining means, and the first-named flange on the plate to limit movement of the plate and card in and away from said panel.

10. A printing device including a carrier having a panel depressed in one face thereof and arranged to extend between opposite edges of the carrier, the marginal portions along the edges of the carrier extended between the aforesaid edges being elevated relative to the panel to thereby define shoulders along the edges of the panel that extend between the aforesaid opposite edges thereof, a printing plate and an index card mounted in said panel in side-by-side relation and between said shoulders with the marginal edges thereof disposed to be interengageable, card retaining means along one edge of the panel and extended between said shoulders and formed to overlie the marginal portion of the card opposite the edge thereof engageable with the plate, a flange on the plate along the edge thereof engageable with the card and formed to overlie the marginal portion of the card adjacent the edge thereof engageable with the plate, other flanges formed along the marginal portions of the plate other than that along which the first-named flange is formed, said other flanges having corresponding faces thereof formed to lie substantially flush with the face of the plate that is engaged with the carrier when the plate is mounted in the panel with the first-named flange thereon projected over the card, the opposite faces of said other flanges being disposed to lie beneath the plane of the face of the plate opposite that engaged with the carrier as aforesaid, plate retaining means along the other free edge of the panel and extended between asid shoulders and formed to closely overlie the flange that is disposed along the edge of the plate opposite that along which the first-named flange is formed, and means on the carrier projected inwardly from said shoulders and spaced above the adjacent face of the panel and formed to closely overlie the other of said flanges that are formed along the edges of said plate that extend in angular relation with the edge thereof along which the first-named flange is formed and effective in cooperation with said shoulders, card retaining means, plate retaining means, and the first-named flange on the plate to limit movement of the plate and card in and away from said panel.

11. A blank for a printing plate on which type characters may be embossed to appear in relief on one face and in intaglio on the opposite face thereof, a flange along one edge of said plate formed to have one face thereof disposed substantially flush with the face of said plate on which type characters embossed on the plate are to appear in relief and having the other face thereof disposed to lie below the plane of the face of the plate on which type characters embossed on the plate are to appear in intaglio, and at least one other flange along another marginal edge of said plate that is formed to have one face disposed to lie substantially flush with the face of said plate on which type characters embossed thereon are to appear in intaglio and having the other face thereof disposed to lie below the plane of the face of the plate on which type characters embossed thereon are to appear in relief.

12. A blank for a printing plate on which type characters may be embossed to appear in relief on one face and in intaglio on the opposite face thereof, flanges along opposite edges of said plate that are formed to have corresponding faces thereof disposed to lie substantially flush with the face of said plate on which type characters embossed thereon are to appear in intaglio and having the other faces thereof disposed to lie below the plane of the face of the plate on which type characters embossed thereon are to appear in relief, and another flange along an edge of the plate disposed in angular relation with said opposite edges, the last named flange having one face thereof disposed to lie substantially flush with the face of said plate on which type characters embossed thereon are to appear in relief and having the opposite face thereof disposed to lie below the plane of the face of the plate on which type characters embossed thereon are to appear in intaglio.

13. A blank for a printing plate on which type characters may be embossed to appear in relief on one face and in intaglio on the opposite face thereof, flanges along opposite edges of said plate and along an edge of said plate that extends in angular relation with said opposite edges of the plate, said flanges having corresponding faces thereof disposed to lie substantially flush with the face of said plate on which type characters embossed thereon are to appear in intaglio and having the opposite corresponding faces thereof disposed to lie below the plane of the face of the plate on which type characters embossed thereon are to appear in relief, and yet another flange formed along an edge of said plate that extends in angular relation with said opposite edges thereof and which has one face thereof disposed to lie substantially flush with the face of said plate on which type characters embossed thereon are to appear in relief and which has the opposite face thereof disposed to lie below the plane of the face of the plate on which type characters embossed thereon are to appear in intaglio.

CARL J. HUEBER.

REFERENCES CITED

The following references are of record in the file of this patent:

UNITED STATES PATENTS

| Number | Name | Date |
|---|---|---|
| 959,725 | Duncan | May 31, 1910 |
| 1,096,495 | Duncan | May 12, 1914 |
| 1,799,418 | Gollwitzer | Apr. 7, 1931 |
| 1,817,587 | Schmutz | Aug. 4, 1931 |
| 1,858,481 | Chisholm et al. | May 17, 1932 |